United States Patent [19]

Fulton

[11] 3,750,118

[45] July 31, 1973

[54] MAGNETIC CORE MEMORY PLANE CONSTRUCTION

[75] Inventor: Thomas Philip Fulton, Norfolk, Mass.

[73] Assignee: RCA Corporation, New York, N.Y.

[22] Filed: Jan. 15, 1971

[21] Appl. No.: 106,913

Related U.S. Application Data

[62] Division of Ser. No. 825,298, May 16, 1969, Pat. No. 3,594,897.

[52] U.S. Cl. ....................340/174 MA, 340/174 JA, 340/174 NA, 340/174 M

[51] Int. Cl. .......................... G11c 5/04, G11c 11/06

[58] Field of Search .............. 340/174 MA, 174 NA, 340/174 VA, 174 M, 174 JA; 29/604

[56] References Cited

UNITED STATES PATENTS

| | | | |
|---|---|---|---|
| 3,508,214 | 4/1970 | Visschedijk | 340/174 MA |
| 3,425,046 | 1/1969 | Apicella, Jr. et al. | 340/174 M |
| 2,985,948 | 5/1961 | Peters | 29/604 |
| 3,181,128 | 4/1965 | Peck et al. | 340/174 R |

*Primary Examiner*—Stanley M. Urynowicz, Jr.
*Attorney*—H. Christoffersen

[57] ABSTRACT

A ferrite magnetic core memory plane construction, and method of construction, in which the edges of the magnetic cores, after being primed, are imbedded in a tenacious material coated on a flexible supporting sheet, the material being a silicone rubber having a jelly-like resilience. The edges of the cores are imbedded an amount equal to about one-half the dimension radially between the inner and outer surfaces of the cores so that the holes in the cores are fully exposed for wires to be threaded therethrough. The cores tend to spring back to their set positions after being displaced in any direction during the assembly of a memory plane. The completed memory plane includes the flexible sheet and rubber-adhered cores as an integral part of the construction to protect the cores from mechanical shock, thermal changes, etc.

1 Claim, 4 Drawing Figures

MAGNETIC CORE MEMORY PLANE CONSTRUCTION

This is a division of application, Ser. No. 825,298 filed on May 16, 1969, and issued as U.S. Pat. No. 3,594,897 on July 27, 1971.

BACKGROUND OF THE INVENTION

The present invention relates to ferrite magnetic core memory plane construction. Core memory planes are customarily constructed by a method including the steps of 1. positioning ferrite magnetic cores in a jig having sockets for receiving the cores, the jig including means for shaking the cores into the sockets, and vacuum holding means for retaining the cores in the sockets, 2. Pressing the adhesive-coated side of a sheet onto the exposed edges of the positioned cores in the jig to adhere the cores to the sheet, 3. Lifting the sheet with the adhered cores from the jig, 4. threading wires through the cores adhered to the sheet, 5. connecting the wires to electrical terminals of a memory plane frame, and 6. removing the sheet adhered to the cores.

While the above-described method of constructing core memory planes has been commercially accepted, the method has required great care on the part of the operator in order to avoid the accidental displacement of cores adhered to the sheet. Any slight displacement of cores greatly hinders and complicates the threading of wires through the cores. The problem of accidental displacement of adhered cores has become increasingly severe as magnetic cores of smaller and smaller dimensions are being employed in order to achieve the highest possible operating speed of the resulting computer memory.

Efforts have been made to prevent the accidental displacement of adhered cores by employing adhesives producing a strong, rigid bond between the sheet and the cores. This approach has not been successful because such strong, rigid adhesives impart physical stresses to the magnetic cores which adversely affect the electro-magnetic properties of the cores. Furthermore, an accidental disturbance of the cores when rigidly adhered tends to break the cores, which are made of a very fragile, sintered ferrite material. The described difficulties encountered during the manufacture of memory planes according to the prior art method, are also present in the completed memory plane during shipment, and later during use in a computer memory.

It is therefore an object of this invention to provide a ferrite magnetic core memory plane construction, and method of construction, in which the ferrite cores are held in their desired precise positions during assembly of the memory plane, and also during use of the memory plane, in a manner which protects the cores from accidental displacement, vibration and damage.

SUMMARY OF THE INVENTION

The disadvantages of prior art constructions are avoided according to the preferred method of practicing the invention by employing a flexible sheet coated with an uncured resin having a jelly-like resilience. The flexible sheet may be a glass fabric sheet, and the resin coating may be silicone rubber. The cores prior to being loaded in the vacuum jig are primed with a material such as silane vapor, which imparts organophilic and hydrophobic properties to the cores. The coated side of the flexible sheet is pressed against the primed cores positioned in a vacuum jig, the sheet is lifted off the jig with the cores adhered, and the resin coating is cured by placing the sheet with adhered cores in an oven. The cores are edge embedded in the resin coating to a depth equal to about one half of the radial distance between the outer and the inner surfaces of the cores. The thickness of the resin coating is selected to provide a small but significant amount of resin between the supporting sheet and the closest portions of the cores. The cores are thus tenaciously and resiliently held during the stringing of wires through the cores, and during subsequent use in a memory.

DESCRIPTION OF THE PREFERRED EMBODIMENT

Figures 1, 3:
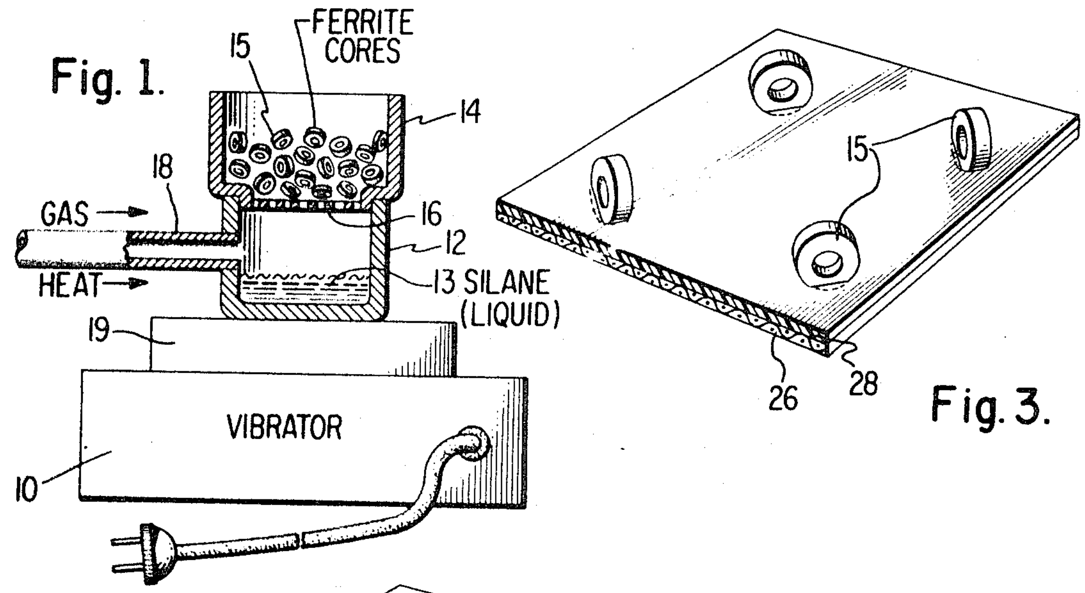
FIG. 1 is a diagram illustrating the apparatus for priming the surfaces of a bulk quantity of ferrite cores with a primer such as polymerized silane.
FIG. 3 is a diagram illustrating adhered cores on the flexible sheet after removal from the vacuum jig.

Reference is not made to FIG. 1 for a description of a method of priming ferrite magnetic cores to ensure their subsequent adhesion to a silicone rubber coating on a flexible sheet. The apparatus shown includes a conventional electrically operated vibrator 10, a liquid container 12 resting on and vibrated by the vibrator 10, and a core container 14 nested on top of the liquid container 12. The core container 14 has a perforate bottom 16 to permit the free passage therethrough of vapor from the liquid container 12. The liquid container 12 includes a pipe connection 18 through which an inert gas of known moisture content is supplied. Provision is also made for the supplying of heat to the liquid container 12. The heat may be supplied by heating the gas fed to the container through the pipe 18. Alternatively the supporting member 19 may include a heating element for heating the liquid in the container 12.

In the operation of the apparatus shown in FIG. 1 a measured quantity, such as 10 cc, of an organosilicon liquid is poured into the liquid container 12. The preferred liquid is a silane, specifically, gamma-aminopropyltri-ethoxysilane sold by General Electric Co. under designation GE–SC–3900. Then a bulk quantity of sintered ferrite magnetic cores 15 is placed in the core container 14 over the liquid container 12. Nitrogen gas having a known moisture content is fed through the pipe 18 to the liquid container 13, from which it escapes through the core container 14 to an exhaust hood. Heat may be applied to the silane liquid 13 by preheating the gas supplied through pipe 18. The temperature in the liquid container 12 may be about 220°C, which may be achieved by preheating the gas to a sufficiently higher temperature to allow for the heat losses in pipe 18. The heat applied to the silane liquid causes it to vaporize and pass in vapor form up through the cores in the core container 14. The entire assembly is vibrated by the vibrator 10 in order to prevent the ferrite cores 15 from sticking to each other and to ensure an even exposure of all surfaces of all cores to the silane vapor.

The thickness of the silane coating deposited on the ferrite cores 15 is determined by the amount of moisture present on the cores themselves, and the amount of moisture present in the gas supplied under pressure to the liquid container 12, and, of course, also on the length of time that the cores are subjected to the silane vapor. The cores will normally be coated to a thickness of perhaps a few hundred molecules of polymerized silane in a period of about 10 or 15 minutes, during which time all of the 10 cc of silane liquid is vaporized at a temperature of 220°C.

Figure 2:
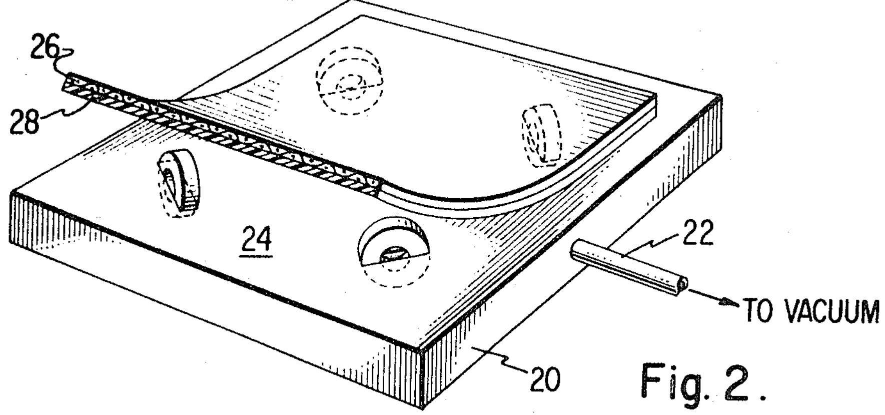
FIG. 2 is a diagram illustrating the step of pressing the coated surface of a flexible sheet down onto cores held in position in a vacuum jig.

Reference is now made to FIG. 2 showing a conventional vacuum jig 20 having sockets for receiving the edges of four cores in a desired pattern. The vacuum jig 20 will normally accommodate a very large number of cores, such as an array of 64 x 64 cores, rather than merely the four cores shown by way of illustration in the drawing. The vacuum jig includes internal passageways (not shown) coupling the vacuum connection 22 to the bottoms of the core-receiving sockets on the top surface 24 of the jig. The vacuum jig 20 is positioned on a vibrator (not shown) so that bulk cores poured onto the top surface are agitated until they randomly fall into sockets, and then are held in place by the vacuum. The sockets in the vacuum jig 20 are dimensioned to receive the cores to a depth equal to about one-half of their outside diameter.

After the cores have been positioned in the sockets in the vacuum jig 20 as shown in FIG. 2, a flexible sheet 26 coated with a resin 28 is drape-rolled onto the exposed edges of the cores positioned in the jig 20.

The flexible sheet 26 may be a glass fabric sheet or tape pre-sized with a mixture of the uncured rubber and a reactive silane primer. Sheet 26 may have a thickness of about 0.002 inch. On the other hand, similar flexible sheets constructed of plastic such as "Mylar," or thin flexible metal, may be used. It is important that the sheet 26 be sufficiently flexible so that it can accommodate slight variations in the heights of the cores in the jig 20. This is necessary because the cores are normally of very small diameter, such as 0.030 inch or less, and the vacuum positioning jig 20 cannot be economically constructed with such a high degree of planar accuracy as to accommodate a rigid planar sheet 26.

The flexible sheet 26 is coated with an uncured resin, which is preferably an uncured silicone rubber, specifically, diamethyl silicone rubber sold by Dow Corning under designation "Mod. 198," and also sold by General Electric Co. A typical formulation is as follows:

100p dimethyl silicone rubber prepolymer (fumed-silica filled)

5.25p benzoyl peroxide paste, 50 percent active in silicone fluid

0–10p flame retardent (antimony trioxide)

0–5p pigment (titanium dioxide)

The thickness of the silicone rubber coating 28 on the flexible sheet 26 is made to be about one-half the radial wall thickness of the cores, i.e. the radial distance between the outer and the inner surfaces of the cores. A coating thickness of about 0.0035 inch is suitable when the cores have an outside diameter of 0.030 inch and an inside diameter of 0.018 inch, in which case the radial wall thickness is 0.006 inch. The degree of imbedment of the cores may be in the range of from one-fourth of, to the full amount of, the radial wall thickness. However, care must be taken that the imbedment does not exceed the full amount of the wall thickness, in which case the holes in the cores would not be fully exposed for the threading of wires therethrough.

A silicone rubber coating 28 having a thickness of 0.0035 inch is also suitable for use with cores having an outside diameter of 0.020 inch and an inside diameter of 0.012 inch. In this case the radial wall thickness is 0.004 inch, and the cores may be imbedded about three-fourths of the radial wall thickness, or 0.003 inch, into the 0.0035-thick rubber coating. The described degrees of imbedment leave a small but significant thickness of the silicone rubber coating 28 between the flexible sheet 26 and the nearest peripheral edges of the cores, whereby the cores are more resiliently mounted than would be the case if the core peripheries touched the flexible sheet 26.

After the flexible sheet 26 is drape-rolled onto the exposed edges of the ferrite cores held by the vacuum jig as shown in FIG. 2, the desired degree of imbedment of the cores into the silicone rubber coating 28 is accomplished by applying a downward force of about 10 pounds per square inch onto the flexible sheet 26. This force may be applied to the top side of the flexible sheet with a roller or by a rubbing action by the gloved fingers of an operator. The desired embedment of the cores can be facilitated by employing the vacuum applied to the vacuum jig 20 to draw the flexible sheet 26 down onto the cores. When the vacuum is employed, it is desirable to also rub the top surface of the flexible sheet 26 to urge the sheet against the cores. However, one or the other, or both, of the described methods may be employed to ensure the desired uniform embedment of the cores in the uncured resin 28.

The flexible sheet 26 with embedded and adhered cores is then lifted off the vacuum jig 20 and turned over with the cores upright as shown in FIG. 3. The cores are shown embedded in the uncured resin 28 an amount equal to about one half of the radial distance between the outer and inner surfaces of the cores. With this degree of embedment, the holes in the cores are sufficiently above the surface of the resin coating 28 to facilitate the threading of wires through the cores. The flexible sheet with adhered cores as shown in FIG. 3 is placed in an oven to cure the resin or silicone rubber 28. The polymerization of the silicone rubber is preferably accomplished by keeping the sheet with adhered cores in an oven at a temperature of about 155°C for about 1 hour.

After the assembly shown in FIG. 3 has been removed from the oven and allowed to cool, the cores are precisely positioned in an extremely flexible, durable and resilient manner. That is, the cores can be disturbed by pressing a finger or an object against the cores causing them to be bent down so their flat surfaces are parallel with the surface of the silicone rubber coating 28. On removal of the deforming force, the cores merely spring back to their original precisely determined positions. The flexible sheet 28 may be rolled up and otherwise deformed without changing the precise positions of the cores.

Figure 4:
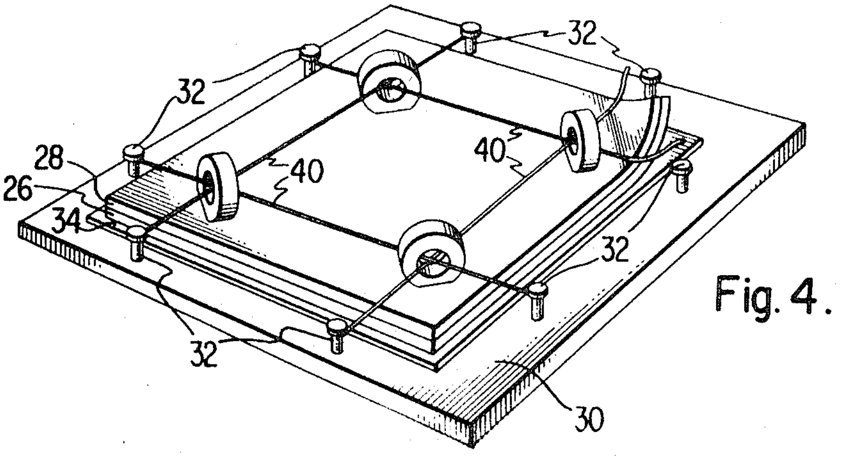
FIG. 4 is a diagram illustrating the adherence of the flexible sheet carrying adhered-cores onto a rigid substrate, and the threading of wires through the cores.

The assembly as shown in FIG. 3 is adapted for the threading of wires through the cores, either in the form shown in FIG. 3, or after being adhered to a rigid substrate as shown in FIG. 4. In FIG. 4, a rigid substrate 30 includes electrical connector terminals 32 arranged around the periphery. The substrate 30 is provided with an adhesive 34, which is preferably applied to the desired area of the substrate by spraying through a mask. The adhesive 34 is preferably a moisture curing, ethanol-evolving silicone, one-component adhesive.

The side of the flexible sheet 26 opposite from the side carrying the magnetic cores is drape-rolled onto the adhesive 34 on the rigid substrate 30. Registry between the cores and the electrical terminals 32 is ensured by employing any suitable guide pin arrangement. The bottom of the flexible sheet 26 is pressed into firm contact with the adhesive 34 by passing a soft or sponge-rubber roller over the top of the flexible sheet 26 and over the cores imbedded therein. The roller causes a temporary displacement of the cores over which it passes, but the cores are so resiliently secured that they spring back to their correct positions immediately after being passed over by the roller.

After the flexible sheet 26 adhered cores is secured by adhesive 34 to the rigid substrate 30, wires 40 are threaded in various directions through the cores. The resilient mounting of the cores greatly facilitates threading of the wires. Each wire used has a relatively stiff "needle" at the leading end which is passed through the cores. The cores are so resiliently mounted that they momentarily adapt their position to receive a slightly mis-directed needle. This facilitation of the threading of a wire through the cores is also accompanied with a significant reduction in the danger of core breakage or damage during the wire threading.

After the wires 40 are threaded through the cores, the ends of the wires are electrically connected by soldering or otherwise to the peripheral terminals 32. The resulting final product is a ferrite magnetic memory core plane assembly suited for combination with other similar planes into a memory stack which, with the addition of drive and sense electronics, constitutes a computer memory.

The silicone rubber coating 28 and the flexible sheet 26 remain a permanent, integral part of the final memory product. The individual cores are protected from vibration and consequent damage in shipment, and later in use in a memory system. The cores are constrained by the wires passing through them, but this constraint permits an undesired movement of the cores on the wires. However, in the construction according to this invention, the edges of the cores embedded in the silicone rubber provide an additional very resilient constraint on the cores so that they are effectively prevented from any undesirable vibration, and yet are free to move a small amount in the process of absorbing a shock or adapting to thermal expansion and contraction effects.

The silicone rubber coating 28 in which the cores are embedded is chemically inert and unaffected by the strong solvents normally employed to degrease an assembled memory plane to remove all vestiges of soldering fluxes and contaminating materials. Furthermore, the silicone rubber is physically resilient over a very wide ambient temperature range such as from −55°C to +125°C.

What is claimed is:

1. A magnetic core memory plane construction comprising a flexible sheet, a coating of silicone rubber cured resin having a jelly-like resilience on said flexible sheet, an array of ferrite magnetic cores adhered to and edge-imbedded in said cured resin coating ot a depth equal to about one-half the radial distance between the outer and inner surfaces of the cores so that the holes in the cores are above the surface of the resin coating, and resin coating having a thickness greater than the depth to which said cores are imbedded therein, said cores having a surface priming coat of polymerized gamma-aminopropyltriethoxysilane, a rigid supporting substrate adhered to the side of said flexible sheet opposite the side having resiliently mounted cores, electrical terminals mounted in fixed relation to said rigid supporting substrate, and wires threaded through said resiliently mounted cores and connected to said electrical terminals.

* * * * *